(12) United States Patent
Aliakseyeu et al.

(10) Patent No.: US 8,766,918 B2
(45) Date of Patent: Jul. 1, 2014

(54) USER FRIENDLY ENTRY OF TEXT ITEMS

(75) Inventors: Dzmitry Viktorovich Aliakseyeu, Eindhoven (NL); Igor Berezhnyy, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 184 days.

(21) Appl. No.: 13/383,105

(22) PCT Filed: Jul. 1, 2010

(86) PCT No.: PCT/IB2010/053021
§ 371 (c)(1),
(2), (4) Date: Jan. 9, 2012

(87) PCT Pub. No.: WO2011/004292
PCT Pub. Date: Jan. 13, 2011

(65) Prior Publication Data
US 2012/0105328 A1 May 3, 2012

(30) Foreign Application Priority Data

Jul. 10, 2009 (EP) .................................. 09165121

(51) Int. Cl.
*G09G 5/08* (2006.01)

(52) U.S. Cl.
USPC ..................................... 345/167; 361/679.18

(58) Field of Classification Search
USPC ................ 345/157, 160–163, 167; 74/471 R, 74/471 XY; 463/37, 38; 700/85; 361/679.1–679.18
See application file for complete search history.

(56) References Cited

U.S. PATENT DOCUMENTS

| | | | | |
|---|---|---|---|---|
| 5,724,449 A * | 3/1998 | Cornerford | .................. | 382/230 |
| 5,724,457 A * | 3/1998 | Fukushima | .................. | 382/311 |
| 5,797,098 A * | 8/1998 | Schroeder et al. | ............ | 455/464 |
| 5,963,671 A * | 10/1999 | Comerford et al. | ........... | 382/230 |
| 6,052,070 A | 4/2000 | Kivela et al. | | |
| 6,204,848 B1* | 3/2001 | Nowlan et al. | ................ | 715/810 |
| 6,487,424 B1* | 11/2002 | Kraft et al. | .................... | 455/566 |
| 7,190,351 B1 | 3/2007 | Goren | | |
| 7,218,249 B2 | 5/2007 | Chadha | | |
| 7,266,780 B2 | 9/2007 | McEvilly et al. | | |
| 7,561,072 B2* | 7/2009 | Pham | .............................. | 341/23 |
| 2003/0016873 A1* | 1/2003 | Nagel et al. | .................. | 382/228 |
| 2003/0017858 A1* | 1/2003 | Kraft et al. | .................... | 455/566 |
| 2003/0212674 A1* | 11/2003 | Nakagawa | ....................... | 707/3 |

(Continued)

FOREIGN PATENT DOCUMENTS

EP    1783987 A2    5/2007

OTHER PUBLICATIONS

E. Mukadah: "Mobile Interface Design With Predictive Algorithm for Improved Text Entry"; Rhodes University, Computer Science Department, Thesis, Nov. 2007,85 page Document.

*Primary Examiner* — Tom Sheng

(57) ABSTRACT

A system is described for predictive text entry. Initially, the items that may be entered by the user are displayed. The user can navigate through these items and enter one of them to a text string (130). A predictive text entry algorithm is used, which depending on the previously entered item, determines items, which are likely to be entered next. A plurality of these items (140), for example two or three, is displayed. The user can then select any one of these items without navigating through the displayed items.

20 Claims, 3 Drawing Sheets

(56) References Cited

U.S. PATENT DOCUMENTS

| | | |
|---|---|---|
| 2004/0066405 A1 | 4/2004 | Wessler et al. |
| 2005/0041011 A1 | 2/2005 | Silfverberg et al. |
| 2006/0001657 A1 | 1/2006 | Monney et al. |
| 2006/0217144 A1 | 9/2006 | Bonnelykke Kristensen et al. |
| 2006/0294462 A1* | 12/2006 | Blair et al. .................... 715/535 |
| 2007/0046641 A1* | 3/2007 | Lim .............................. 345/173 |
| 2007/0136688 A1* | 6/2007 | Mirkin et al. ................. 715/816 |
| 2007/0169147 A1* | 7/2007 | Kii .................................. 725/38 |
| 2007/0245259 A1* | 10/2007 | Carlson ......................... 715/773 |
| 2008/0062136 A1* | 3/2008 | Nakamura et al. ............ 345/171 |
| 2009/0234632 A1* | 9/2009 | Hasegawa et al. ................ 704/1 |
| 2009/0327313 A1* | 12/2009 | Kung et al. .................... 707/100 |
| 2010/0149107 A1* | 6/2010 | Perry ............................ 345/170 |

* cited by examiner

USER FRIENDLY ENTRY OF TEXT ITEMS

BACKGROUND OF THE INVENTION

1. Technical Field

The present invention relates to a system and method for entering text items, such as characters.

2. Description of Related Art

The rapid increase in the number and capacity of broadband Internet connections has lead to the introduction of new Internet-based services. One of these novel services is Internet Protocol Television (IPTV). The introduction of IPTV reduced the gap between TV and personal computers, since many features that were only available on a personal computer became accessible on a TV. The question is, however, how to make these new features easily accessible to users. Conventional remote controls fail to provide an easy and enjoyable interaction since they are not designed to support these new features, while on the other side a keyboard and mouse that can support these new features are not desired in the living room. One of the new features is the ability to search media content provided by service provider or search for particular program in a program guide. This search is often done by means of a text entry. As, the conventional remote control is not well suited for text entry, currently the most often used method for text entry is by using a screen keyboard operated by arrow keys.

Over the recent years, devices, in particular mobile phones have become available using predictive text entry methods. Such predictive text entry methods attempt to predict which letter mapped to a particular key of the keypad is most likely to be selected when the key is pressed during text entry. In this manner, the number of key taps required to enter non-numeric text is reduced compared to conventional multi-tap text entry.

Furthermore, hand-held communication devices have become available with small form factors or aesthetically pleasing shapes. In such hand-held communication devices, the provision of a conventional numeric keypad is often either impossible or undesirable. Consequently, the hand-held communication devices typically rely on menu driven displays and voice-recognition technologies such as voice-dialing and voice-entered commands in combination with a simple navigation key assembly instead of a full numeric keypad. However, in such devices, text messaging, if supported, requires extensive scrolling through a fixed character menu, and repeated keystrokes to select characters for a text message being composed.

U.S. Pat. No. 7,218,249 B2 discloses a hand-held communication device providing navigation key-based predictive text entry. It includes a display disposed for displaying characters selectable for entry in a character position of a text string being entered and a navigation key assembly for scrolling through and selecting from the characters displayed on the display. The characters displayed during text entry are arranged according to the probability of selection of each character for entry in the character position so that the character with the highest probability of selection is selected with a single input from the navigation key assembly.

However, with this device it will relatively often happen that the user does not wish to select the character with the highest probability but another character. It will then be necessary to scroll to this other character in order to enter it.

SUMMARY OF THE INVENTION

It would be advantageous to provide a system and method enabling easy entry of text items, such as characters, without overloading a control device, such as a remote control or a handheld communication device with multiple keys for this purpose.

To better address this concern, in a first aspect of the invention a system for entering text items by a user is presented, which comprises input means, a display controller for controlling the display of items that may be entered and an input controller for enabling navigation through the displayed items and entering any one of them by means of the input means. The display controller is configured for causing the display of a plurality of items, which have been determined likely to be entered next by a prediction engine, as proposed items. The input controller is configured for enabling the user to enter any one of the proposed items by means of the input means without further navigation through the displayed items.

So, a plurality of items with a high likelihood of being entered next is displayed, preferably two or three. Any one of these items may be directly entered by the user without further navigation by means of a single input, such as a single key press, a single click or a single movement. So, the chance that a user can enter the desired item without further navigation is relatively high. As a result, items such as characters may be entered in a user friendly way.

In case that the user wishes to enter another item than the proposed items, he may navigate through the displayed items to the other item and enter the other item.

According to an embodiment of the invention, the display controller is configured for causing the display of the items that may be entered in an ordered list, for example consisting of pairs of items or sets of three items placed in a column through which the user can navigate. In case that the items are letters, the list may be alphabetically ordered.

Preferably, the display controller is configured for causing the display of the proposed items at the location in the list of the previously entered item and causing the display of the other items at their initial position. In this way, the list presented to the user is easily comprehensible. The user easily finds and selects an item other than the proposed items.

According to a further embodiment, the proposed items are the items with the highest likelihood to be entered next and the display controller is configured for causing the display of the list of items ordered according to the likelihood of items to be entered next, the distance of the displayed items to the proposed items increasing with a decreasing likelihood of the items to be entered next. As a result, when the user wishes to enter another character than the proposed characters, generally he can navigate quickly to the desired character.

According to a still further embodiment, the input means comprises a continuous control, such as a rotary input and/or a sliding input for enabling the navigation through the displayed items. A continuous control, contrary to discrete controls such as arrow keys, enables user friendly navigation through the items that may be selected.

Preferably, the continuous control is one dimensional. This enables user friendly navigation in case that the items that may be entered are displayed as a list.

The rotary input may be a scroll wheel. Scroll wheels require few changes to the hardware of electronic devices wherein the system is to be used and take a small space thereon. Furthermore, they enable user friendly navigation through and entry of items.

The input means may comprise a plurality of keys, each one of the keys enabling the entry of one of the proposed items. Alternatively, the scroll wheel is a tilting wheel enabling clicking of the wheel in different ways, wherein each way of clicking results in the entry of one of the proposed items. According to another alternative embodiment, the rotary input is a touch wheel, enabling the navigation through the items by moving over the touch wheel and entry of each of the proposed items by a corresponding stroke on the touch wheel. All three embodiments enable user friendly selection of any of a plurality of proposed items.

The system may be implemented in any electronic device, for example a remote control or a handheld communication device. It combines language aware word prediction with a specific user interaction and allows quickly entering short text messages or search keywords in any given language.

According to a further aspect of the invention method is provided for entering text items by a user comprising the steps of:

controlling the display of items that may be entered, enabling navigation through the displayed items and entering any one of them, causing the display of a plurality of items, which have been determined likely to be entered next, as proposed items, and enabling the user to enter any one of the proposed items without further navigation through the displayed items.

Preferably, the method according to the invention is implemented by means of a computer program.

The computer program may be embodied on a computer readable medium or a carrier medium may carry the computer program.

These and other aspects of the invention will be apparent from and elucidated with reference to the embodiments described hereinafter.

BRIEF DESCRIPTION OF THE DRAWINGS

The invention will be better understood and its numerous objects and advantages will become more apparent to those skilled in the art by reference to the following drawings, in conjunction with the accompanying specification, in which.

Throughout the figures like reference numerals refer to like elements.

DETAILED DESCRIPTION OF THE PRESENT INVENTION

Figure 1:
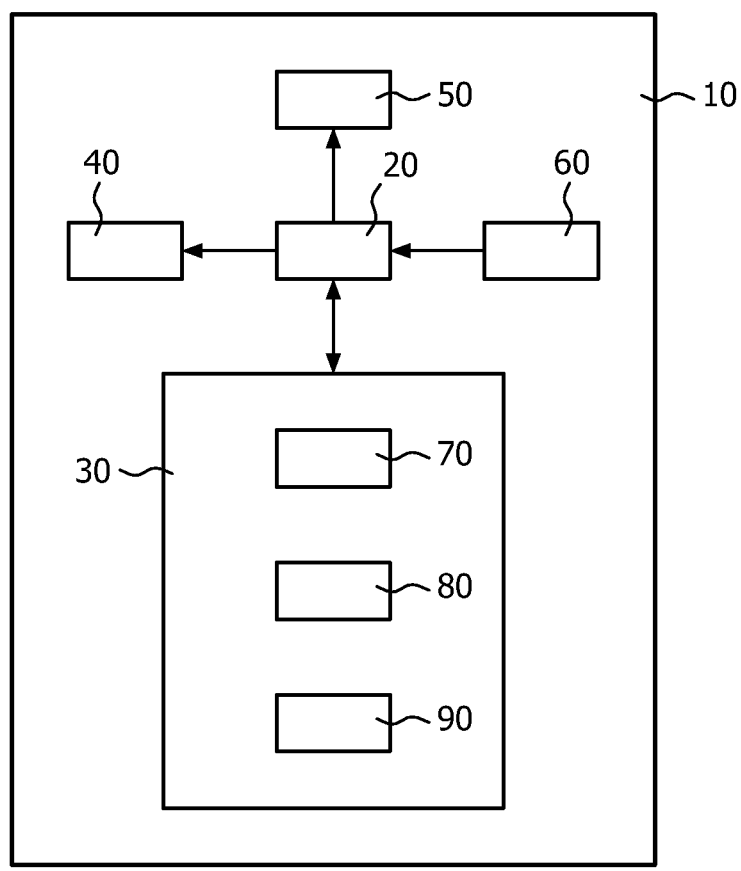
FIG. 1 shows a block diagram of a remote control comprising a system according to an exemplary embodiment of the present invention.

FIG. 1 shows a block diagram of a remote control 10 comprising a system for predictive text entry according to an embodiment of the present invention. It comprises a processor 20 with associated memory 30, a display 40, an IR transmitter 50 for transmitting control commands to an appliance and input means 60.

The memory 30 is loaded with a first software module 70. When loaded to the processor 20, this software module provides the input control functionality, i.e. it determines the meaning of commands received via the input means 60. The memory 30 is furthermore loaded with a second software module 80. When loaded to the processor 20, this software module provides the display control functionality, i.e. it controls the information that is displayed on the display 40. The memory 30 is furthermore loaded with a third software module 90, which when loaded to the processor, provides prediction engine functionality for predicting the likelihood of characters to be entered next based on a previously entered text string. The memory comprises also software for providing further functionality of the remote control 10, such as generating the control commands to be sent to the appliances, which are controlled by the remote control 10, etc. This well known functionality is not relevant for the present invention and will therefore not be further described here.

Figure 2:
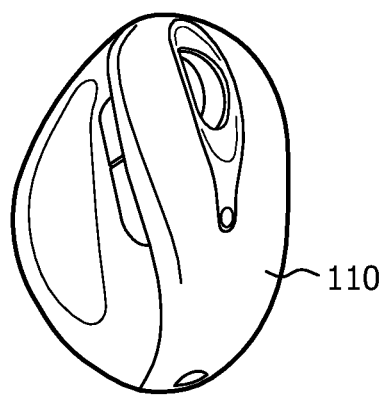
FIG. 2 shows an example of a scroll wheel that may be used in the present invention.
Figure 3:
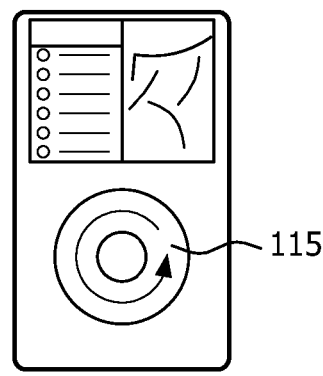
FIG. 3 shows an example of a touch wheel that may be used in the present invention.

The input means 60 comprise a tilting scroll wheel 110 as depicted in FIG. 2 or a touch wheel 115 as depicted in FIG. 3 for navigating through the displayed items. The scroll wheel may be a tilting wheel as described at http://www.microsoft.com/hardware/mouseandkeyboard/features/tiltwheel.mspx. Tilting wheel technology supports three-way clicking, enabling the user to click the scroll wheel by pressing down, left or right. The touch wheel 115 is similar to the one used in the iPod® product. It has a touch sensitive surface enabling the user to scroll by moving his finger circularly over the wheel and to click by making a left or right movement over the wheel. It may also be a "virtual scroll wheel" displayed on a touch screen.

Figure 4:
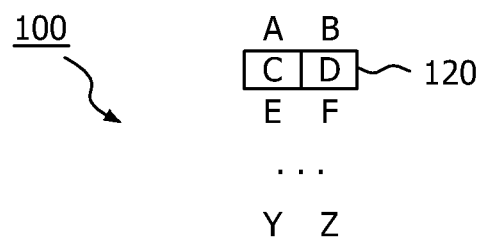
FIG. 4 shows the display of an alphabetical list of characters according to an exemplary embodiment of the present invention.
Figure 5:
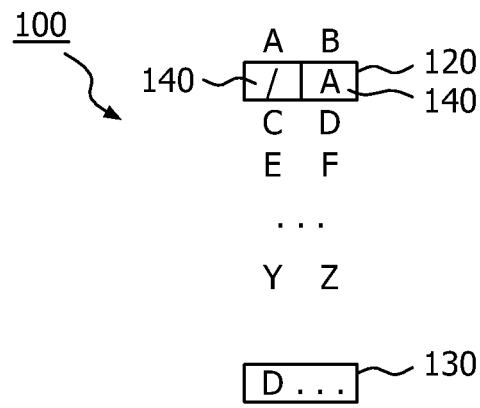
FIG. 5 shows the list of FIG. 4 including the most likely characters to be entered next at the cursor position.
Figure 6:
FIG. 6 shows how to manipulate a scroll wheel and a touch wheel to navigate through the list of characters.
Figure 7:
FIG. 7 shows how to manipulate a scroll wheel and a touch wheel to enter a character.

According to an embodiment of the invention, the items are single characters placed in pairs in an alphabetically ordered column 100, as shown in FIG. 4. The user can scroll through the list by rotating the scroll wheel 110 or moving his finger circularly over the touch wheel as shown in FIG. 6, thereby moving cursor 120 through the list. To select (enter) one of the two characters of a pair under the cursor 120 the user clicks the scroll wheel to the left or right or makes a right click or left click on the touch screen by means of a right or left movement, as shown in FIG. 7. When the initial character is selected (in the example of FIG. 4 this is the letter [D]) this letter is added to a text string 130 and the original column of characters is expanded in such a way that the most probable characters to be selected next are placed under the cursor 120 as proposed characters 140 in the alphabetical ordered list, as shown in FIG. 5. Accordingly, they can be directly selected (entered) by the user without further navigating (scrolling) by means of either a left click or a right click. As shown in the example of FIG. 5, if the user enters [D] the column 100 of characters expands placing the two characters, which are most likely to be selected next, in this case [A], which is the most likely character and [I], which is the next most likely character under the cursor 120. In the example of FIG. 5, the most likely character is displayed on the right and the next most likely character on the left but of course this may also be the other way round. Also, the most likely characters may be displayed in alphabetical order, e.g. the first letter on the left and the second letter on the right. The remaining letters are displayed in alphabetical order at their initial position in the list.

Each of the proposed characters 140 can be directly selected (entered) by the user without scrolling through the list by means of either a left click or a right click. In case that the user wishes to select another character than the proposed characters, he simply scrolls to the desired character and enters it, either by a right or a left click.

In order to determine the probability of characters being entered next, a prediction engine 90 known per se is used. Some probability based text auto-completion algorithms that may be used by the prediction engine are described at http://www.customtyping.com/tutorials/kb/wp_auto_complete-.htm. The probability depends on the dictionary that is used. In case of a remote control, an interesting application for the user is to search an electronic program guide. In this case, the dictionary is defined by the finite amount of words present in a program guide.

Instead of being a single character, some of the items may be small sets of characters (e.g. two). For example, if a user enters [B], the items [Y] and [AR] may be placed under the cursor as proposed items, the first item [Y] corresponding to a single character and the second item [AR] corresponding to a set of two characters.

Figure 8:
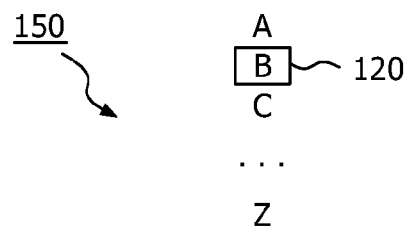
FIG. 8 shows the display of an alphabetical list of characters according to another exemplary embodiment of the present invention.
Figure 9:
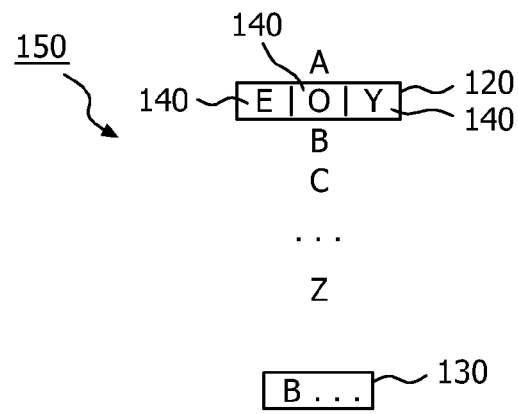
FIG. 9 shows the list of FIG. 8 including the most likely characters to be entered next at the cursor position.

According to an alternative embodiment, a column 150 consisting of single characters per row is initially displayed as shown in FIG. 8. In the example, the user scrolls to the letter [B] by rotating the scroll wheel and enters this letter by pressing the wheel down. A this time, the three most likely characters to be entered next, in this example [Y], [O] and [E] are placed under the cursor 120 as proposed characters 140, as shown in FIG. 9. The user can select any of the proposed characters by a left, a right or a "middle" click.

The functionality described with reference to the FIGS. 4-9 is implemented by means of the first software module 70, second software module 80 and third software module 90 in combination.

While the invention has been illustrated and described in detail in the drawings and foregoing description, such illustration and description are to be considered illustrative or exemplary and not restrictive; the invention is not limited to the disclosed embodiments.

In this regard it is to be noted that the component of the system according to the invention may be spread over multiple devices. For example, the display 40 may not be located in the remote control but it may be the screen of the corresponding television set. Also, it is not necessary to implement the predictive engine 90 locally in the remote control. It may be implemented in another device.

The predictive text entry system according to the invention can be applied to other electronic devices than remote controls for television, for example handheld (mobile) communication devices, GPS navigation devices, car audio systems, etc.

Instead of using scroll wheel with tilt wheel technology, a scroll wheel similar to the ones used in a computer mouse may be used in the system. Such a scroll wheel comprises two discrete keys. One of those may serve for the left click and the other one for the right click. The "middle" click may be performed by pressing the scroll wheel down.

Alternatively, a "clickable" slider may be used, enabling the navigation through the list of characters by sliding and selecting characters by clicking.

Furthermore, instead of displaying the characters in an alphabetically ordered list, the characters may be displayed according to their probability of being selected next. So, the proposed characters, which are the characters with the highest likelihood to be entered next, are displayed at a certain location in the list and the rest of the list of characters is ordered according to the probability. The characters with a high probability to be selected next are displayed in the list close to the proposed characters and the characters with a low probability to be selected are displayed far from the proposed characters.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The present invention can be resumed as follows: a system for predictive text entry wherein, initially the items that may be entered by the user are displayed. The user can navigate through these items and enter one of them to a text string. A predictive text entry algorithm is used, which depending on the previously entered item, determines items, which are likely to be entered next. A plurality of these items, for example two or three, is displayed. The user can then select any one of these items without navigating through the displayed items.

The invention claimed is:

1. System for entering text items by a user comprising:
   input means;
   a display controller for controlling the display of text items that may be entered, in an ordered list; and
   an input controller for enabling navigation through the displayed text items and entering any one of them by means of the input means,
   wherein the display controller is configured for causing the display of a plurality of text items, which have been determined likely to be entered next by a prediction engine, as proposed items, the proposed items being displayed at the location in the list of a previously entered text item and causing the display of the other text items at their initial positions, and
   wherein the input controller is configured for enabling the user to enter any one of the proposed items by means of the input means without further navigation through the displayed items.

2. System according to claim 1 wherein the input controller is configured for enabling the user to enter an other text item, rather than the proposed items, by means of the input means by navigating through the displayed text items to the other text item and entering the other text item.

3. System according to claim 1 wherein the text items are letters and the list is alphabetically ordered.

4. System according to claim 1 wherein the input means comprise a rotary input and/or a sliding input for enabling the navigation through the displayed text items and/or proposed items.

5. System according to claim 4 wherein the rotary input or sliding input is one dimensional.

6. System according to claim 4 wherein the rotary input is a scroll wheel.

7. System according to claim 6 wherein the scroll wheel is a tilting wheel enabling the navigation through the proposed items and/or displayed text items by rotating the wheel and clicking of the wheel in different ways, wherein each way of clicking results in the entry of one of the proposed items or displayed text items.

8. System according to claim 4 wherein the rotary input is a touch wheel, enabling the navigation through the proposed items and/or displayed text items by moving over the touch wheel and entry of each of the proposed items or displayed text items by a corresponding stroke on the touch wheel.

9. System according to claim 4 wherein the input means comprises a plurality of keys, each one of the keys enabling the entry of one of the proposed items or displayed text items.

10. Remote control or handheld communication device comprising a system according to claim 1.

11. System or entering text items by a user comprising:
    input means;
    a display controller for controlling the display of text items that may be entered, in an ordered list; and
    an input controller for enabling navigation through the displayed text items and entering any one of them by means of the input means,
wherein the display controller is configured for causing the display of plurality of text items as proposed items, and
wherein the proposed items are the text items with the highest likelihood to be entered next as determined by a prediction engine, and wherein the display controller is configured for causing the display of the list of text items ordered according to the likelihood of text items to be entered next, the distance of the displayed text items to the proposed items increasing with a decreasing likelihood of the displayed text items to be entered next.

12. System according to claim 11 wherein the input controller is configured for enabling the user to enter an other text item, rather than the proposed items, by means of the input means by navigating through the displayed text items to the other text item and entering the other text item.

13. System according to claim 11 wherein the input means comprise a rotary input and/or a sliding input for enabling the navigation through the displayed text items and/or the proposed items.

14. System according to claim 13 wherein the rotary input or sliding input is one dimensional.

15. System according to claim 13 wherein the rotary input is a scroll wheel.

16. System according to claim 15 wherein the scroll wheel is a tilting wheel enabling the navigation through the proposed items and/or displayed text items by rotating the wheel and clicking of the wheel in different ways, wherein each way of clicking results in the entry of one of the proposed items or displayed text items.

17. System according to claim 13 wherein the rotary input is a touch wheel, enabling the navigation through the proposed items and/or displayed text items by moving over the touch wheel and entry of each of the proposed items or displayed text items by a corresponding stroke on the touch wheel.

18. System according to claim 13 wherein the input means comprises a plurality of keys, each one of the keys enabling the entry of one of the proposed items or displayed text items.

19. System for entering text items by a user comprising:
    input means;
    a display controller for controlling the display of text items that may be entered; and
    an input controller for enabling navigation through the displayed text items and entering any one of them by means of the input means,
wherein the display controller is configured for causing the display of a plurality of text items, which have been determined likely to be entered next by a prediction engine, as proposed items, and
wherein the input controller is configured for enabling the user to enter any one of the proposed items by means of the input means without further navigation through the displayed text items,
wherein the input means comprise a rotary input and/or a sliding input for enabling the navigation through the displayed text items and/or proposed items,
wherein the rotary input is a scroll wheel,
wherein the scroll wheel is a tilting wheel enabling clicking of the wheel in different ways,
wherein each way of clicking results in the entry of one of the proposed items or displayed text items.

20. System for entering text items by a user comprising:
    input means;
    a display controller for controlling the display of text items that may be entered; and
    an input controller for enabling navigation through the displayed text items and entering any one of them by means of the input means,
wherein the display controller is configured for causing the display of a plurality of text items, which have been determined likely to be entered next by a prediction engine, as proposed items, and
wherein the input controller is configured for enabling the user to enter any one of the proposed items by means of the input means without further navigation through the displayed text items,
wherein the input means comprise a rotary input and/or a sliding input for enabling the navigation through the displayed text items and/or proposed items,
wherein the rotary input is a touch wheel, enabling the navigation through the proposed items and/or displayed text items by moving over the touch wheel and entry of each of the proposed items or displayed text items by a corresponding stroke on the touch wheel.

* * * * *